US009436300B2

(12) United States Patent
Sathish et al.

(10) Patent No.: US 9,436,300 B2
(45) Date of Patent: Sep. 6, 2016

(54) METHOD AND APPARATUS FOR PROVIDING A MULTIMODAL USER INTERFACE TRACK

(75) Inventors: Sailesh Kumar Sathish, Tampere (FI); Igor Danilo Diego Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 46 days.

(21) Appl. No.: 13/545,667

(22) Filed: Jul. 10, 2012

(65) Prior Publication Data

US 2014/0019860 A1    Jan. 16, 2014

(51) Int. Cl.
*G06F 3/00*    (2006.01)
*G06F 3/038*    (2013.01)
*H04N 21/462*    (2011.01)

(52) U.S. Cl.
CPC ....... *G06F 3/038* (2013.01); *G06F 2203/0381* (2013.01); *H04N 21/4621* (2013.01)

(58) Field of Classification Search
USPC ........ 715/716, 723, 726, 200–204, 210, 211, 715/233; 386/200, 232, 223, 220, 239, 240, 386/278, 282, 331, 353, 356; 725/37, 20, 725/10, 34, 47, 54
See application file for complete search history.

(56) References Cited

U.S. PATENT DOCUMENTS

| | | | | |
|---|---|---|---|---|
| 6,356,921 | B1 * | 3/2002 | Kumar | G06F 17/30905 348/E7.071 |
| 6,564,263 | B1 * | 5/2003 | Bergman et al. | 709/231 |
| 7,197,715 | B1 * | 3/2007 | Valeria | 715/747 |
| 7,283,973 | B1 * | 10/2007 | Loghmani | G06Q 30/00 379/67.1 |
| 7,376,897 | B1 * | 5/2008 | Mao | G06F 9/4443 715/708 |
| 7,603,291 | B2 * | 10/2009 | Raiyani | G06Q 30/02 705/26.61 |
| 8,392,821 | B2 * | 3/2013 | DeMarco et al. | 715/230 |
| 8,490,022 | B2 * | 7/2013 | Stone | G11B 19/025 715/854 |
| 2003/0046401 | A1 * | 3/2003 | Abbott | G06F 9/4443 709/228 |
| 2005/0136897 | A1 * | 6/2005 | Praveenkumar et al. | 455/414.1 |
| 2005/0207442 | A1 * | 9/2005 | Zoest | G11B 20/00086 370/465 |
| 2007/0011007 | A1 * | 1/2007 | Greene et al. | 704/246 |
| 2007/0226635 | A1 * | 9/2007 | Goebel | G06F 17/30905 715/745 |
| 2007/0300185 | A1 * | 12/2007 | Macbeth et al. | 715/825 |
| 2008/0005679 | A1 * | 1/2008 | Rimas-Ribikauskas et al. | 715/745 |

(Continued)

FOREIGN PATENT DOCUMENTS

| | | |
|---|---|---|
| WO | WO 02/075718 A2 | 9/2002 |
| WO | WO 2010/068175 A2 | 6/2010 |
| WO | WO 2011/043622-A23 | 4/2011 |

OTHER PUBLICATIONS

Bodell et al., "W3C Multmodal Interaction Framework", web page, May 6, 2003, pp. 1-20, http://www.w3.org/TR/mmi-framework/.

(Continued)

*Primary Examiner* — Linh K Pham
*Assistant Examiner* — Wendy Nicholas
(74) *Attorney, Agent, or Firm* — Alston & Bird LLP

(57) ABSTRACT

An approach is provided for providing a multimodal user interface track. A multimodal generation platform determining one or more user interface elements for interacting with at least one media segment. The multimodal generation platform further causes, at least in part, an inclusion of the one or more user interface elements as at least one track of the at least one media segment. Accordingly, when the at least one track is processed during a presentation of the at least one media segment by at least one device, the at least one track causes, at least in part, an enablement of the one or more user interface elements.

16 Claims, 12 Drawing Sheets

(56) References Cited

U.S. PATENT DOCUMENTS

| | | | |
|---|---|---|---|
| 2010/0199182 A1* | 8/2010 | Lanza et al. ............... | 715/723 |
| 2012/0192239 A1* | 7/2012 | Harwell et al. ............. | 725/109 |
| 2012/0320013 A1* | 12/2012 | Perez et al. ............... | 345/207 |
| 2013/0222369 A1* | 8/2013 | Huston et al. .............. | 345/419 |
| 2013/0241951 A1* | 9/2013 | Dickinson ............. | G06F 3/017 345/619 |
| 2013/0328809 A1* | 12/2013 | Smith ................. | G06F 3/016 345/173 |

OTHER PUBLICATIONS

Gao et al., "Accurate and Low-Delay Seeking Within and Across Mash-Ups of Highly-Compressed Videos", research paper, 2011, pp. 105-110, Proceedings of the 21st international workshop on Network and operating systems support for digital audio and video, ACM, New York.

Liu et al., "Active post-refined multimodality video semantic concept detection with tensor representation", 2008, pp. 91-100, MM '08 Proceedings of the 16th ACM international conference on Multimedia, ACM, New York.

Yang et al., "Multi-modality web video categorization", 2007, pp. 265-274, MIR '07 Proceedings of the international workshop on Workshop on multimedia information retrieval, ACM, New York.

* cited by examiner

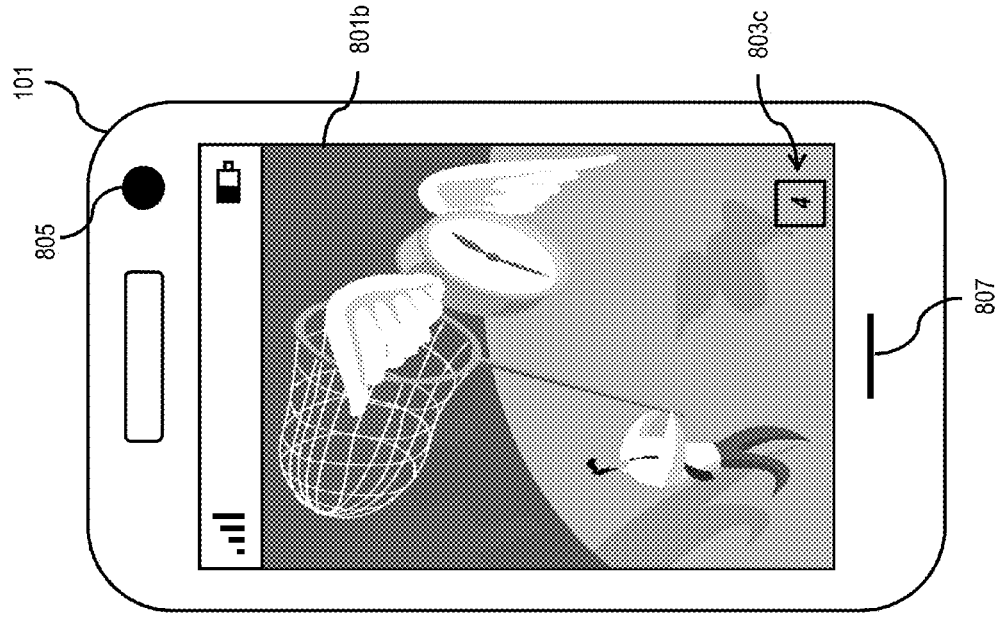
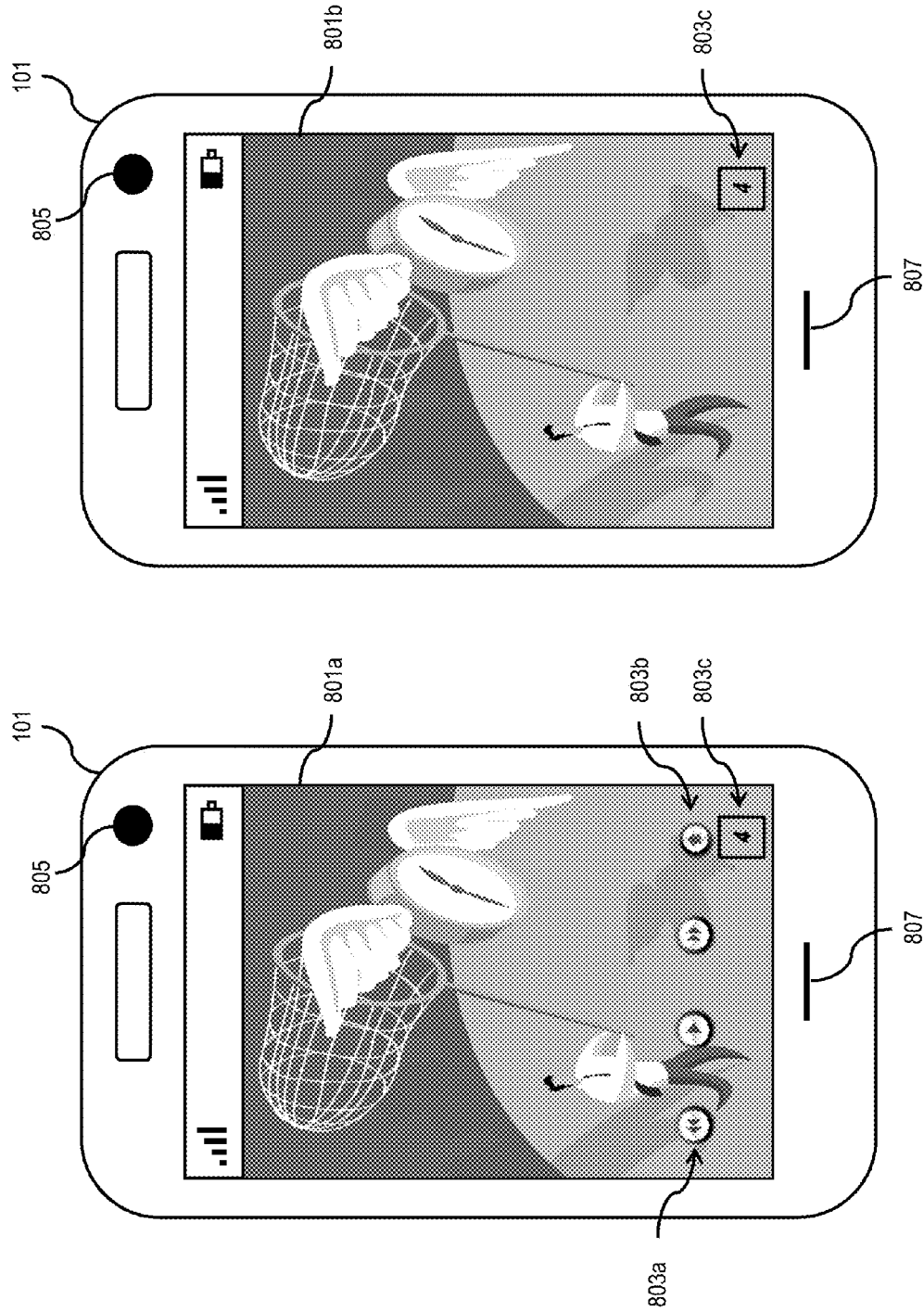

METHOD AND APPARATUS FOR PROVIDING A MULTIMODAL USER INTERFACE TRACK

BACKGROUND

Service providers and device manufacturers (e.g., wireless, cellular, etc.) are continually challenged to deliver value and convenience to consumers by, for example, providing compelling network services. With respect to media files, multitrack media files are gaining popularity. Service providers are developing formats that will enable usage of multiple tracks for multiple media types. However, there is currently no framework that provides inclusion of multiple user interface elements that allows semantic rendering of a multitrack media file based on the media file's characteristics and/or features. Accordingly, service providers and device manufacturers face significant technical challenges to enable multimodal user interface encoding of multitrack media files based on media characteristics, as well as device capabilities and user preferences.

Some Example Embodiments

Therefore, there is a need for an approach for associating one or more user interface elements to at least one multimodal track of a media segment.

According to one embodiment, a method comprises determining one or more user interface elements for interacting with at least one media segment. The method also comprises causing, at least in part, an inclusion of the one or more user interface elements as at least one track of the at least one media segment, wherein the at least one track is processed during a presentation of the at least one media segment by at least one device to cause, at least in part, an enablement of the one or more user interface elements According to another embodiment, an apparatus comprises at least one processor, and at least one memory including computer program code for one or more computer programs, the at least one memory and the computer program code configured to, with the at least one processor, cause, at least in part, the apparatus to determine one or more user interface elements for interacting with at least one media segment. The apparatus is also caused to include the one or more user interface elements as at least one track of the at least one media segment, wherein the at least one track is processed during a presentation of the at least one media segment by at least one device to cause, at least in part, an enablement of the one or more user interface elements.

According to another embodiment, a computer-readable storage medium carries one or more sequences of one or more instructions which, when executed by one or more processors, cause, at least in part, an apparatus to determine one or more user interface elements for interacting with at least one media segment. The apparatus is also caused to include the one or more user interface elements as at least one track of the at least one media segment, wherein the at least one track is processed during a presentation of the at least one media segment by at least one device to cause, at least in part, an enablement of the one or more user interface elements.

According to another embodiment, an apparatus comprises means for determining one or more user interface elements for interacting with at least one media segment. The apparatus also comprises means for causing, at least in part, an inclusion of the one or more user interface elements as at least one track of the at least one media segment, wherein the at least one track is processed during a presentation of the at least one media segment by at least one device to cause, at least in part, an enablement of the one or more user interface elements.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A and 8B are diagrams of user interfaces utilized in the processes of FIGS. 3-7, according to various embodiments;

DESCRIPTION OF SOME EMBODIMENTS

Examples of a method, apparatus, and computer program for associating one or more user interface elements to at least one multimodal track of a media segment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
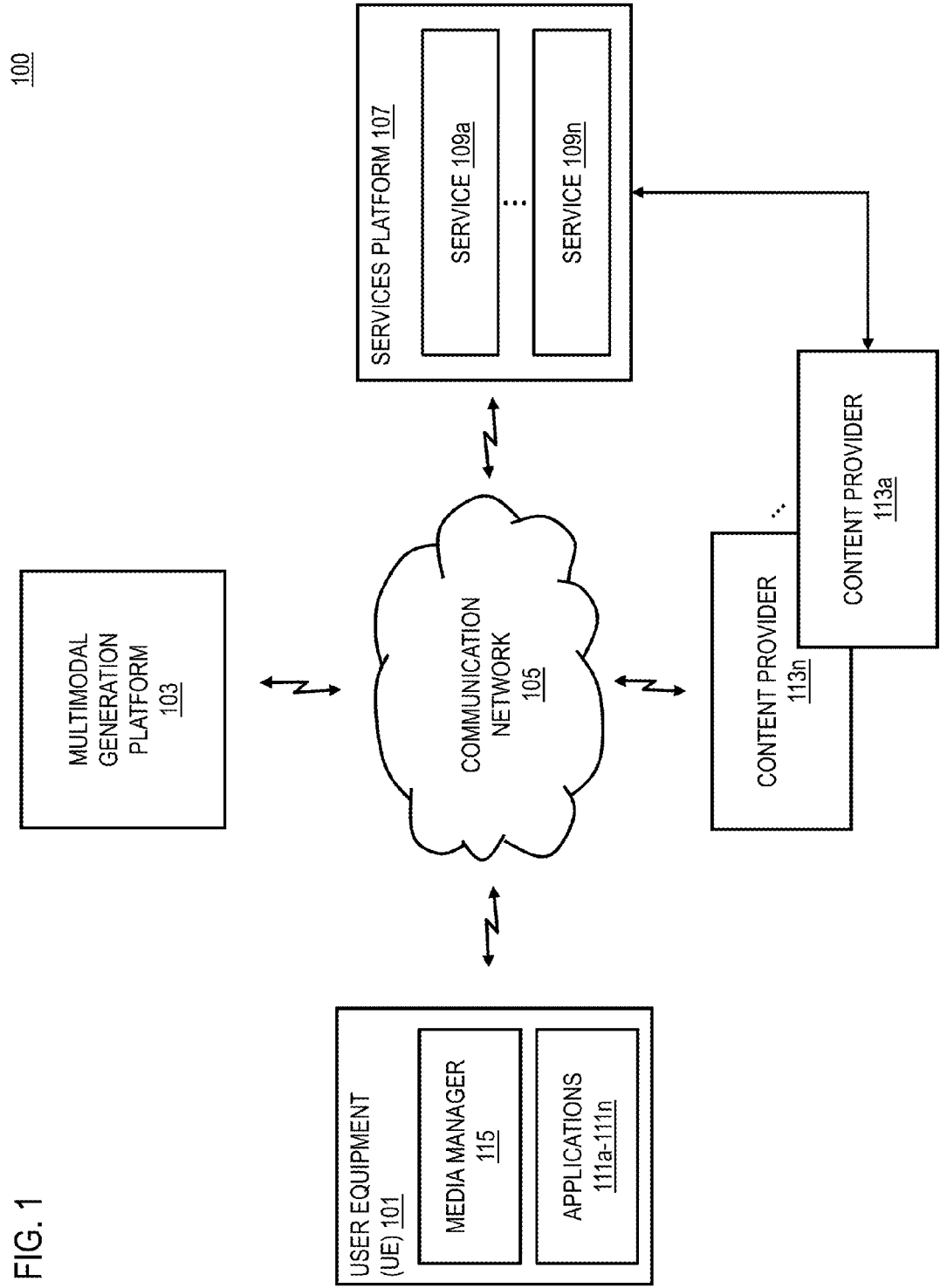
FIG. 1 is a diagram of a system capable of associating one or more user interface elements to at least one multimodal track of a media segment, according to one embodiment.

FIG. 1 is a diagram of a system capable of associating one or more user interface elements to at least one multimodal track of a media segment, according to one embodiment. As discussed above, multitrack videos are gaining popularity. Soon, there will be a format that enables usage of multiple tracks for multiple types of media. However, there is currently no framework available that allows for the inclusion of multiple user interface elements across various modalities that would allow for the presentation of a multitrack media file and/or segment of a file, in addition to user interface elements of various modalities, based on the media characteristics, user preferences and/or device capabilities.

To address this problem, a system 100 of FIG. 1 introduces the capability to associate one or more user interface elements to at least one multimodal track of a media segment to create a multimodal track appended to the media segment. The framework illustrated in FIG. 1 adds a separate multimodal track to at least one media segment that is synchronized with the at least one segment to provide interactions between a user, and/or a device associated with the user, and the at least one segment. The at least one media segment and/or media file may be, for example, one or more images and/or videos (including 3D images and/or videos), audio, text, graphics, and the like, either individually or any combination thereof. By way of example, a media segment may include two or more frames of a video. In one embodiment, the two or more frames constituting the media segment may further include multiple tracks. The separate multimodal track and the various user interface elements within the track may be based, at least in part, on capabilities of the device that may present the at least one track, preferences of a user associated with the device, contextual information associated with the user and/or the device, or a combination thereof.

In one embodiment, a multimodal track including user interface elements of various modalities may be added to a media file, where the media file includes multiple media segments. The multiple media segments may individually or in combination include multiple camera angles of a single event (e.g., crowd-sourced videos of an event from various users and/or vantage points), multiple views from the same location (e.g., wide-angle, telephoto, front view, rear view, left view, right view, top view, etc.), embedded contextual information (e.g., date of media, sensor data, user data, etc.), and the like. From this information, the system 100 can determine one or more user interface elements for interacting with the at least one media segment (e.g., such as a media file including multiple media segments of multiple camera angles with multiple views, etc). Additionally, the user interface elements may be associated with various modalities and allows for greater flexibility in the way the user interacts with the media segment. The system 100 can further cause an association of the one or more user interface elements as at least one track of the at least one media segment, thereby creating a multimodal track appended to the media segment. By way of example, appending the multimodal track to the media segment may constitute adding information to an MP4 file by extending the MP4 file's format information. The at least one track may then be processed during presentation of the media segment by the device presenting the media segment to cause an enablement of the one or more user interface elements within the multimodal track. The presentation may occur based on a file transfer between two or more devices and/or a device and a service or content provider. The presentation may also occur via streaming or during playback of the media segment and/or media file stored locally at a device. Where the media segment is streamed from a service (e.g., embodied in a server), for example, to a device, there may be one or more interactions between the device and the server to effectuate the streaming of the media segment including the appended multimodal track.

The device associated with the presentation may include, for example, a mobile phone, a smart phone, a tablet, a personal computer, a home projector, a navigation device, etc. (as discussed in greater detail below with respect to the UE 101). The device associated with the presentation may also be located in different environments, such as in a car, in a plane, at a user's place of employment, at the user's home, within a smart space, etc. The system 100 allows for the generation of the user interface elements within the track that may be based on the device and/or on the environment of the device to allow for greater flexibility in control over the media segment. Alternatively, in one embodiment, the system 100 allows for the generation of one or more duplicative user interface elements across various modalities (e.g., full multimodal capabilities) such that the resulting multimodal track can be used by multiple different platforms instead of each platform having a specific track added to a media segment upon a request for the media segment. For example, one device may not be compatible with speech user interface elements while another device may be compatible. A single multimodal track may include both speech user interface elements and, for example, tactile user interface elements that are compatible with both devices to cover various modalities.

Although not limited to the foregoing, some exemplary modality types of user interface elements include a speech modality, a text-to-speech modality, a visual modality (e.g., gestures), a tactile modality, and an olfactory modality. The user interface elements added to a track of at least one media segment may be specific to any one of the above exemplary modalities, or may include user interface elements from a wide number or multiple modality types. The user interface element may, for example, be any type of element that constitutes, corresponds to, or is associated with a user interface such that a user may interact with the media segment including the multimodal track through a user interface by interacting with the user interface element. The user interface element may also be associated with any type of user interface that allows for user interaction with an application and/or device executing the media segment, one or more services associated with the media segment and/or device executing the media segment, or a combination thereof.

By way of example, with respect to a tactile modality, a user interface element may constitute one or more representations of one or more functions associated with the media segment that are presented at a display associated with a device presenting the media segment. Thus, where the media segment is a video, the user interface element may correspond to some type of visual indicator (e.g., a icon) associated with starting playback of the video, rewinding the video, fast forwarding the video, changing one or more angles and/or views of playback of the video, etc. The user may then select the user interface element by, for example, touching the representation of the user interface element presented at the display. The user may also use one or more input devices to select the representation of the user interface element, such as some kind of pointing device (e.g., mouse, track pad, etc.).

By way of example with respect to a speech modality, the user interface element may correspond to one or more terms and/or phrases that are recognized by speech recognition software and/or hardware such that a user may speak the one or more terms and/or phrases to execute the functionality. Thus, where the media segment is a video, the user interface element may correspond to a term and/or a phrase associated with the functionality of starting playback of the video, rewinding the video, fast forwarding the video, changing one or more angles and/or views of playback of the video, etc. Specifically, the user interface element may be one or more terms and/or phrases that may include, for example, Rewind, Fast Forward, Play, Change Angles, Change View, etc.

By way of example with respect to a visual modality, the user interface element may correspond to one or more gestures a user may perform, such as one or more gestures associated with the user's hands. For example, a user may wave his or her hand right and left, up and down, or any type of movement that may be recognized by gesture recognition software and/or hardware. Thus, where the media segment is a slideshow of images, the user interface element may correspond to one or more gestures associated with functionality of next picture (e.g., hand wave to the right), previous picture (e.g., hand wave to the left), skip three pictures (e.g., hand wave down), etc.

As shown in FIG. 1, the system 100 comprises a user equipment (UE) 101 having connectivity to a multimodal generation platform 103 via a communication network 105. Although FIG. 1 includes only one UE 101, the system 100 supports any number (e.g., more than one) of UE 101. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications 111) that may perform various processes and or functions at the UE 101. By way of example, one of the applications 111 (e.g., application 111a) may be a client for presenting one or more media files and/or segments of media files. In one embodiment, the client may support presenting one or more video files, one or more audio files, or a combination thereof, such as one or more movies, one or more slideshows, one or more presentations, etc. The client may have standard or default user interface elements that are used during the presentation of media files. However, based on the system 100, the client may be enabled to present and/or include one or more additional user interfaces elements during the presentation of a media segment and/or media file based on the inclusion of the multimodal track including user interface elements of various modalities. Thus, in a sense, the client may be a thin client that provides functionality associated with presenting a media file and/or a media segment that is enhanced by the inclusion of various types of user interface element across various modalities based on the multimodal track generated by the multimodal generation platform 103.

The UE 101 may also include a media manager 115. The media manager 115 may be, for example, a specialized one of the applications 111, one or more hardware and/or software modules of the UE 101, or a combination thereof for rending one or more media segments and/or media files and one or more associated user interface elements that are appended to the one or more media segments and/or media files within the multimodal track. The media manager 115 interfaces with or receives information from the multimodal generation platform 103 for processing a multimodal track at the UE 101 that the multimodal generation platform 103 appended to a media segment and/or a media file. By way of example, an application 111a (e.g., such as a client) requests a media file, which is processed by the multimodal generation platform 103 to include an appended multimodal track. The media manager 115 then may process the multimodal track received from the multimodal generation platform 103 and send the processed information to the application 111a (e.g., client) for presentation of the one or more user interface elements included in the multimodal track.

The system 100 may also include a services platform 107 that may include one or more services 109a-109n (collectively referred to as services 109). The services 109 may be any type of service that provides any type (or types) of functions and/or processes to one or more elements of the system 100. By way of example, the one or more services 109 may include social networking services, information provisioning services, content provisioning services (e.g., such as movies, videos, audio, images, slideshows, presentations, etc.), and the like. In one embodiment, one of the services 109 (e.g., a service 109a) may be an automated video edit service. The service 109a may process one or more media segments and/or media files to analyze, for example, the type, subject, and characteristics associated with the media segment and/or media files. For example, the service 109a may insert cue points between various segments of a media file, may distinguish one or more tracks within a media file, may determine when a media file was created, may determine sensory information (e.g., contextual information) associated with the media file, etc. Where the media file is a video or a combination of images such as a slideshow, the service 109a may determine various angles and/or dimensions associated with the images. Thus, the service 109a may process the one or more media segments and/or media files to supply information to the multimodal generation platform 103 to be able to determine the user interface elements for interacting with the media segment and/or media file. Further, where the services 109 include media segment and/or media file provisioning services, the UE 101 may request specific media from the services 109 for presenting at the UE 101. Further, one or more services 109 may provide one or more media segments and/or media files to the UE 101 without the UE 101 requesting the media segments and/or files. Additionally, although the multimodal generation platform 103 is illustrated in FIG. 1 as a separate entity, in one embodiment, the functions and/or processes performed by the multimodal generation platform 103 may be embodied in one or more services 109 at the services platform 107. By way of example, where one or more of the services 109 provide for streaming of one or more media segments and/or media files, the one or more services 109 also may perform the processing discussed herein associated with the multimodal generation platform 103 to append a multimodal track to the media segments and/or media files.

The system 100 may further include one or more content providers 113a-113n (collectively referred to as content providers 113). The content providers 113 may provide content to the various elements of the system 100. The content may be any type of content or information, such as one or more videos, one or more movies, one or more songs, one or more images, contextual information regarding the UE 101, a user of the UE 101, or a combination thereof, and the like. In one embodiment, a UE 101 may constitute one of the content providers 113, such as when two or more UE 101 are connected in a peer-to-peer scenario. In one embodiment, one or more media segments and/or one or more media files may be requested by one or more services 109a from the content providers 113 for transmitting to the UE 101. In which case, the multimodal generation platform 103 may process the media segments and/or media files prior to transmission to the UE 101 from the content providers 113 by way of the services 109. Further, in one embodiment, the functions and/or processes performed by the multimodal generation platform 103 may be embodied in one or more content providers 113. By way of example, where one or more of the content providers 113 provide content of one or more media segments and/or media files, the one or more content providers 113 may also perform the processing discussed herein associated with the multimodal generation platform 103 to append a multimodal track to the media segments and/or media files.

Further, although the multimodal generation platform 103, the services platform 107, and the content providers 113 are illustrated as being separate elements of the system 100 in FIG. 1, in one embodiment, the functions and/or processes performed by the multimodal generation platform 103, the services platform 107 (e.g., including the services 109), and the content providers 113 may be embodied in a single element of the system 100. The single element may then store one or more media segments and/or media files, append multimodal tracks to the one or more media segments and/or media files, and provide the one or more media segments and/or media files (e.g., via streaming) to devices (e.g., the UE 101) in the system 100.

The UE 101 may send a request for the media segment, or the media segment may be sent to the UE 101 based on one or more other devices and/or services 109 requesting the segment for the at least one device. Under either approach, the multimodal generation platform 103 may receive a request and determine a multimodal track including user interface elements associated with the media segment. In one embodiment, where the UE 101 requests the media segment, the UE 101 may send with the request capability information associated with the device (e.g., a device profile extension (DPE) which may be a dynamic profile of the device or a CC/PP based UAProf (User Agent Profile) information, which may be a static profile of the device), preference information associated with the user of the device (e.g., a personal preference profile or user profile), contextual information associated with the device and/or the user of the device, or a combination thereof. The capability information of the device (e.g., UE 101) may include the current capabilities of the device and/or future capabilities of the device. The multimodal generation platform 103 processes the capability information, the preference information and/or the contextual information and builds a multimodal track of user interface elements from the information. Thus, in one embodiment, the created track is specific to the particular device and/or the particular user of the device. However, the multimodal track may be generic to any number of similar devices and or users based on similar capabilities and/or preferences of the devices and/or users.

In one embodiment, the information that is sent to the multimodal generation platform 103 may be incomplete. In which case, the multimodal generation platform 103 may build a full track, including a fully multimodal track, or a default track, including default modalities of the user interface elements, to associate with the media segment. Under this approach, the incomplete information (e.g., capability information, preference information, and contextual information) may be partially or fully compensated for with default modality or fully multimodal user interface elements. The resulting track associated with the media segment may then be sent to the device for presentation and processing of the track to enable the user interface elements of the various modalities.

In one embodiment, the multimodal generation platform 103 determines templates based on features and/or characteristics extracted from processing the media segment. The templates may be particular to one or more modalities based on the extracted features and/or characteristics of the media segment. Templates may be used that are specific for each modality, or there may be templates that cover multiple modalities. By way of example, with respect to an audio modality, the multimodal generation platform 103 may first fill in a standard template that contains fixed words and/or tokens that would be used by a local speech recognizer associated with a UE 101. One or more words and/or tokens that are familiar to a user could be construed as standard audio (e.g., speech) user interface elements available to a client framework for presentation and/or enablement of the media segment supporting an audio user interface. In one embodiment, the words and/or tokens may be locally resident on the UE 101, or may be stored in one or more content providers 113 or provided by one or more services 109. Where the words and/or tokens are stored locally, the enablement of the user interface elements during presentation of the media segment may occur while the UE 101 is offline. However, where the words and/or tokens are stored over a network, the enablement of the user interface elements may allow for the inclusion of more user interface elements (such as more words and/or tokens) that are accessible over the network. In one embodiment, a speech recognizer local to a UE 101 may be able to generate Finite State Grammar (FSG) that includes tokens for speech that are recognizable by the speech recognizer. The multimodal generation platform 103 may then receive these tokens to include as user interface elements within a multimodal track.

In one embodiment, prior to the multimodal generation platform 103 determining user interface elements of various modalities for a media segment, a service 109a (e.g., an automated video editor) may determine information regarding the media segment, including one or more other media segments, one or more tracks, and the like, such as from a full media file. With respect to a full media file, including the media segment, the information may include, for example, a track identifier, an index of each media segment, a number of media segments, one or more keywords for the media segments, and viewing angles, track names, subjects and/or topics of the media segments (e.g., persons and/or objects in the media segments). The creation of the multimodal track of the user interface elements may then be based on this information.

By way of example, the following may represent a multimodal track, including audio (e.g., speech) and visual (e.g., gesture) modalities, with a finite set of tokens (e.g., grammar tokens) for speech.

```
<generalCommands>
<tokens>next | skip | next scene | another view<tokens>
<action>
    Skip Segment
</action>
</generalCommands>
<navigateStatements>
<speechTokens> goto | go | show | </speechTokens>
<actions>
    <asrAction>currentSegmentSkip</asrAction> //asr: automatic speech
    recognizer
</actions>
</navigateStatements>
//segment specific command set below, represented by an id and frame
address
    <id=1234 frameBegin=123 frameEnd=345>
    <specificCommands >
    <alternateViewCommands>
    <general>
        <speechToken>show another view | show next | other view
        | change view </speechToken>
        <action>
        <skipCurrentTrack />
        <chooseAlternate trackId=* />
        </action>
    </general>
    <actionID value=2345>
    <gesture type=turn actionType=progressive
    containerType=alternateActionList containerID=4567>
    //progressive means start from current state
    //example if speech modality is front, then media rendering is
    track 1, then with gesture of "turn", //trackId 2 is selected as it
    progresses to next state from state=trackId=1
    //chooses alternateActionList container with containerID = 4567
    (shown below)
    <alternateActionList id=4567>
    <singleAction>
        <speechToken>front</speechToken>
            <action>
                <showTrack trackId=1/>
            </action>
    </singleAction>
    <singleAction>
        <speechToken> left | show left </speechToken>
            <action>
                <showTrack trackId=2/>
//example of nested action list: going deeper with selection of a track, then
navigating within the track
                <singleAction>
                <speechToken>next | skip | goto next
                </speechToken>
                    <action>
                        <asrAction>currentSegmentSkip</asrActi
                        on>
                    </action>
                </singleAction>
            </action>
    </singleAction>
    <singleAction>
        <speechToken> Right | show right </speechToken>
            <action>
                <showTrack trackId=3/>
            </action>
    </singleAction>
    <singleAction>
        <speechToken> Back | show back view | show back
        </speechToken>
            <action>
                <showTrack trackId=4/>
            </action>
    </alternateActionList>
    </gesture>
    </actionID>
    </alternateViewCommands>
    </specificCommands>
```

-continued

```
    <actions></actions>
</id>
```

In one embodiment, other modalities, such as gesture definitions and tactile definitions can be integrated within a multimodal rule set or provided separately for each modality. The integration of various modalities may be done based, for example, on the same identifications and/or references across each unimodal user interface definitions and/or rule set, or can be done based on the multimodal generation platform 103 calculating frame overlap to which each unimodal definition would apply. When presenting the media segment, the media manager 115 may present the at least one track, including the user interface elements of one or more modalities, combining each unimodal interaction definition through the use of the same identification cross referencing each modality definition or through frame addressing if direct integration within the at least one track (e.g., the multimodal track) is not provided.

In one embodiment, the multimodal generation platform 103 can insert at least one semantic track that describes the media segment, one or more media segments of a media file, and/or the entire media file based on any one or more of the media segments. By way of example, the semantic track may be made up of semantic sections. One or more of the semantic sections may describe one or more particular segments of a media file. However, the semantic track need not describe all of the media segments in a media file. Where the at least one media segment is a video, the semantic track associated with the media segment may have a start frame number, time information, an end frame number, or a combination thereof. Further, the at least one semantic track may include the above segment addressing in addition to, for example, topic description of the at least one media segment, number of tracks in the media segment, a primary track for the media segment, one or more rules for the media segment for single track presentation (such as frame numbers for each track plus timing information), a multimodal user interface identifier for the media segment, direction or placement information for each segment in case of multi-track presentation, tags specific to each track in the media segment, and track specific topics, if applicable.

In one embodiment, the at least one semantic track may be used in combination with the multimodal track of the one or more user interface elements. However, if the multimodal track is not supported by a particular device presenting a media segment and/or media file, or if the user of the device decides to use their own interactions or standard/default interactions with the media segment, the semantic track can provide the information that can be used for rendering and/or other services associated with presenting the media segment without use of the multimodal track. The at least one semantic track can be represented using any standard methods such as a XML representation, a binary track representation, etc.

In one embodiment, one or more clients (e.g., application 111a) at the UE 101 can present the at least one media segment. The client can provide basic functionality by looking at, for example, the number of tracks provided in the media segment. In such cases, based on the number of tracks, certain words and/or tokens may be used for navigating between the tracks. In certain embodiments, similar interactions can be performed on other modalities as well, such as visual (e.g., gestures) and/or tactile modalities. The one or more modalities may refer to these standard ontologies of the clients that define known user interface elements. The user interface elements will contain references to these ontologies to ensure that a standardized vocabulary and corresponding interpretation is done for the specific modalities.

In one embodiment, the multimodal generation platform 103 allows for the insertion of one or more scripts for initiation of one or more actions associated with the media segment and/or multimodal track. The one or more scripts may then be processed based on the processing of the media segment. In one embodiment, the one or more scripts may determine the indication of user feedback information regarding the at least one media segment. By way of example, the one or more scripts may determine whether the user speaks one or more hot words, which may be one or more words defined within modalities rules that allow for user feedback. For instance, the user may say "nice," "looks good," "rating 4 starts," etc. associated with the presentation of a particular media segment. The multimodal generation platform 103 may then send information regarding the hot words and the particular media segment to, for example, one or more services 109 for additional actions to be performed by, for example, the one or more services 109 (such as compiling multiple user information regarding the media segment).

In one embodiment, the one or more scripts allow for and/or constitute one or more contextual event handlers. The one or more scripts may determine contextual information associated with at least one device, a user of the at least one device, or a combination thereof. Based on the contextual information, the media manager 115 may, for example, include one or more user interface elements within the at least one multimodal track rather one or more other user interface elements. For instance, the at least one track may include user interface elements associated with speech and tactile modalities. Where the user is in a context where both tactile and speech interactions are possible and/or likely, the multimodal track may contain user interface elements associated with both modalities and both modalities may be active. However, where the user's contextual information changes, such as the user begins to drive a car, only the speech user interface elements may be used based on, for example, the tactile modality possibly causing too many distractions. The script may therefore deactivate the user interface elements associated with the tactile modality.

Further, for example, where the battery contextual information associated with a device indicates that the battery has above a threshold level of charge, the multimodal track may include more than one modality of user interface elements, such as speech and tactile modalities that may be active. However, where the battery contextual information indicates that the battery has below a threshold level of charge, one or more scripts associated with the at least one multimodal track may determine the change in battery contextual information and cancel or limit any modality that requires more battery power/charge to implement as compared to another modality, such as speech over tactile modalities. By way of example, where the multimodal track is already associated with a media segment, the one or more scripts may cause the media manager 115 to stop processing user interface elements associated with a visual modality. Further, by way of example, where the media segment is streamed from one or more services 109 and a multimodal track is dynamically appended to the media segment, the one or more scripts may cause the transmission of one or more signals back to the one or more services 109 that may stop the addition of visual user interface elements from being appended to the media segment. The one or more scripts may be associated with any other type of contextual information, such as determining the presence of a software protection dongle attached or associated with the device (e.g., UE 101), or the presence of a wireless network and a type of the wireless network (e.g., 3G, LTE, etc.).

By way of example, the UE 101, the multimodal generation platform 103, the services platform 107, the services 109 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
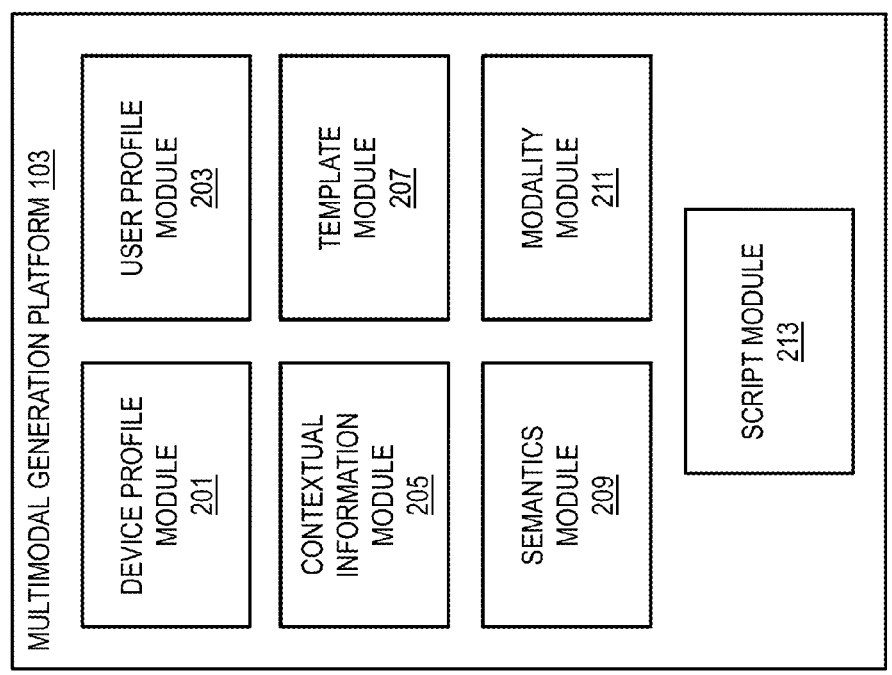
FIG. 2A is a diagram of the components of a multimodal platform, according to one embodiment.

FIG. 2A is a diagram of the components of a multimodal generation platform 103, according to one embodiment. By way of example, the multimodal generation platform 103 includes one or more components for associating one or more user interface elements to at least one multimodal track of a media segment. It is contemplated that the functions of these components may be combined in one or more components or performed by other components of equivalent functionality. For example, one or more clients (e.g., applications 111) associated with the UE 101 may perform the functions of these components. In this embodiment, the multimodal generation platform 103 includes a device profile module 201, a user profile module 203, a contextual information module 205, a template module 207, a semantics module 209, a modality module 211, and a script module 213.

The device profile module 201 may determine the capabilities of the devices that present the media segments and/or media files that the multimodal generation platform 103 associates with a multimodal track. The capabilities may be defined based on, for example, one or more device capability files that are transmitted to the multimodal generation platform 103 or referred to upon a request of a media segment and/or media file. The files may be formatted according to a device profile extension (DPE). The capabilities defined by the file may be static and/or dynamic and can represent the current and/or future capabilities of the device. For example, the capabilities may be based on a current processing load associated with the device such that the multimodal generation platform 103 can determine whether to include user interface elements of modalities that may require greater than normal/average processing power. The capabilities may also be based on other resources, such as the battery charge of the device, whether the device is currently connected to one or more sensors, etc. The resources may also be specific to certain modalities. For example, the device profile may include the words and/or tokens that a local speech recognizer at the device is compatible with.

The user profile module 203 may determine preference information regarding one or more users associated with a device that will present a media segment and or a media file. The preference information may relate to the types of modalities the user prefers, such as a tactile modality rather than an audio modality. The user preferences may also be specific within a particular modality, such as the specific words and/or tokens that a user prefers with respect to an audio modality.

The contextual information module 205 determines contextual information from one or more services, the UE 101, or a combination thereof regarding the UE 101 and/or the user of the UE 101. The contextual information module 205 may then transmit the contextual information to, for example, the modality module 211 for determining the multimodal track based, at least in part, on the contextual information. The contextual information may be based on, for example, the location of the UE 101 and/or the user of the UE 101, one or more activities the user of the UE 101 previously participated in, is currently participating in, or will participate in, or a combination thereof. By way of example, the contextual information module 205 may determine that the user of the UE 101 is currently driving in a car, at home reading a book, at the office in a conference call, etc. Based on these different contexts, the contextual information module 205 can pass the contextual information to the modality module 211 to determine the user interface elements to be included within the multimodal track.

The template module 207 includes one or more templates that may be particular to one or more modalities of user interface elements. The templates may have various features and/or categories that are filled in based on, for example, features and/or characteristics of the media segment or media file. By way of example for an audio or speech modality, specifically speech recognition, the template module 207 may determine a speech recognition template for user interface elements and fill in the template based on fixed words and/or tokens that will be used by a speech recognizer local to a UE 101. The fixed words and/or tokens may be based on, for example, the template and may be modified based on, for example, the device capabilities, the user preferences, and/or the contextual information. The words and/or tokens associated with the template may be familiar to the user and could be construed as standard speech associated with user interface elements available to a client. As discussed above, these words and/or tokens may be resident locally at the device or may be resident on one or more networked devices and/or services 109 and accessible to the device. Other templates associated with other modalities can be generated based on a similar approach by filing in features associated with the modalities that can be used as user interface elements for interacting with a media segment and/or file.

The semantics module 209 appends one or more semantic tracks to the media segment and/or media file that describes one or more segments associated with the media file and/or describes the media segment. With respect to a media file, the semantic track may be comprised of one or more sections that describe one or more particular segments of the media file. The semantic track, however, need not describe all of the segments of a media file, and need not describe an entire media segment. As discussed above, a media segment, or one or more segments of a media file, is a combination of two or more frames, images, and the like, depending on the type of media. The semantic track will describe the segments based on identification of some starting reference, some ending reference, timing information, or a combination thereof. By way of example, with respect to the media file constituting a video file, the starting reference may be a starting frame number, a time length, and/or an ending frame number.

The semantics module 209 may determine one or more semantic elements for describing the media segment and/or segments of a media file. In one embodiment, the service 109a that processes the media segment and/or media file for determining, for example, the characteristics and/or features of the media segment and/or media file that are associated with the user interface elements of various modalities may also process the media segment and/or media file for defining the semantic information. For instance, where the media file is a video associated with multiple views and/or angles, the semantics module 209 can insert semantic elements in a semantic track associated with the media file that describes and/or defines the various views and/or angles. This information may then be used by a user of a UE 101 presenting the media file for controlling the presentation and/or rendering of the media file. The semantics module 209 may define the semantics track based on, for example, any standard method, such as an XML representation, a binary track representation, and the like. The media manager 115 of the UE 101 may subsequently process the semantic track including the semantic elements when also processing the multimodal track, or in the alternative to processing the multimodal track, during presentation of the associated media file and/or media segment.

The modality module 211 determines the modality specific instructions for generating user interface elements across various modalities that are then associated with one or more media segments and/or media files. In one embodiment, the modality module 211 may include separate unimodal logic creation engines for each modality type (e.g., speech, gesture, tactile, etc.) that may be continuously and/or periodically updated. In one embodiment, the modality module 211 may include a single multimodal logic creation engine that covers the various modality types. The modality module 211 uses the user interface element templates from the template module 207, along with inputs from unimodals (if any) compared against the device capabilities, user preferences, and/or contextual information to determine the user interface elements that are associated to the media segment and/or media file within the multimodal track. The modality module 211 may also include one or more scripts from the script module 213 within the multimodal track. The modality module 211 may associate the multimodal track with the media segment and/or media file based on any particular format or standard format prior to sending the media file and/or media segment to the client on the UE 101.

In one embodiment, media files and or media segments may be processed by a client (e.g., an application 111a) such that the client can provide basic functionalities by looking at, for example, the number of tracks associated with the media files and/or media segments. In such cases, based on the number of tracks, certain standardized ontologies of user interface elements of various modalities can be used for navigating between the various tracks, such as by looking at particular segments or asking for scene changes. The user interface elements of a multimodal track generated by the modality module 211 of the multimodal generation platform 103 may refer to these standardized ontologies that define the user interfaces. The multimodal track created by the modality module 211 will contain references to these ontologies to ensure that standardized user interface elements and the corresponding standardized interpretation is maintained for each specific modality.

The script module 213 determines one or more scripts that may be included in the multimodal track. The scripts may be associated with various functions and/or processes related to the multimodal track, such as allowing for user feedback information regarding a media segment and/or media file, providing for one or more contextual event handlers, and the like. In one embodiment, one or scripts may be inserted into the multimodal track that monitor for specific user actions, such as speaking one or more hot words that are associated with comments and/or ratings associated with the presentation of a media segment and/or media file. In one embodiment, the contextual information module 205 interfaces with the script module 213 to activate one or more contextual handler scripts that are present in the multimodal track. The one or more scripts can affect the user interface elements that are enabled during a presentation of a media segment and/or a media file. Various contexts of the user and/or the UE 101 that are determined by the contextual information module 205 may activate one or more scripts that activate and/or deactivate one or more user interface elements. By way of example, certain modalities, such as an audio modality based on speech recognition may use additional words and/or tokens that are accessible over a network. The presence of an active network connection at a device may trigger a contextual event handler that adjusts the words and/or tokens associated with the user interface elements of the speech modality.

Figure 2B:
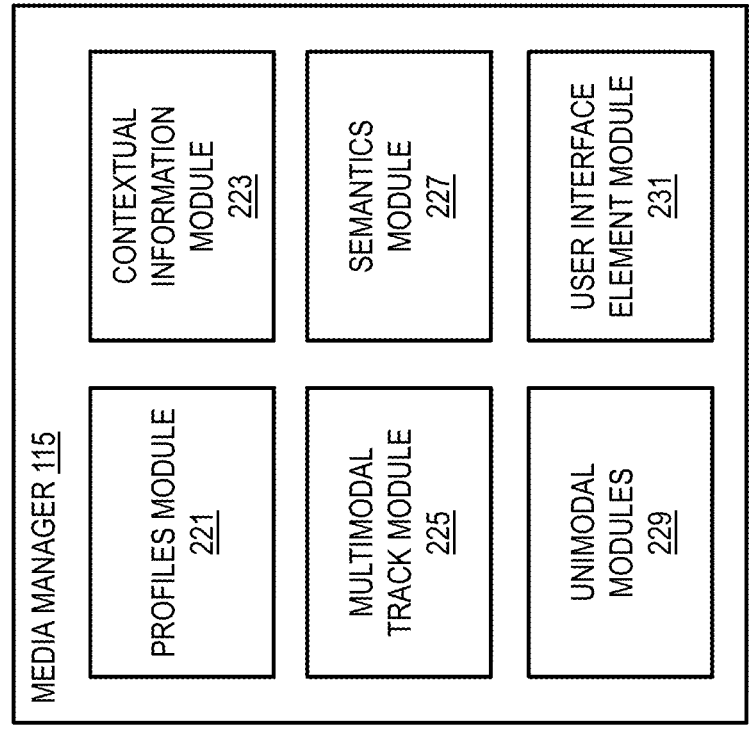
FIG. 2B is a diagram of the components of a media manager, according to one embodiment.

FIG. 2B is a diagram of the components of a media manager 115, according to one embodiment. By way of example, the media manager 115 includes one or more components for processing one or more multimodal tracks associated with one or more media segments and/or media file. It is contemplated that the functions of these components may be combined in one or more components or performed by other components of equivalent functionality. For example, one or more clients (e.g., applications 111) associated with the UE 101 may perform the functions of these components. In this embodiment, the media manager 115 includes a profiles module 221, a contextual information module 223, a multimodal track module 225, a semantics module 227, unimodal modules 229, and a user interface element module 231.

The profiles module 221 contains information regarding, for example, the device capabilities of the device associated with the media manager 115, and user preferences associated with the user associated with the device with the media manager 115. The profiles module 221 may send information and/or links regarding the device capabilities and/or the user preferences to the multimodal generation platform 103 upon the device associated with the media manager 115 requesting one or more media segments and/or media files. In one embodiment, when one or more other devices and/or services 109 request media files and/or media segments for the device associated with the media manager 115, the profiles module 221 may be instructed by the one or more other devices and/or services 109 to transmit the device capabilities and/or the user preferences to the multimodal generation platform 103, or may be queried by the multimodal generation platform 103 for such information.

In one embodiment, the contextual information module 223 determines the contextual information associated with the device and/or the user of the device, and sends the contextual information to the multimodal generation platform 103 for processing to determine the multimodal track to associate with a media file and/or media segment. The contextual information module 223 may determine any type of contextual information from, for example, one or more sensors, one or more applications 111, or a combination thereof associated with the UE 101. The contextual information may be, for example, location information, activity information, appointment information, movement information, etc. The contextual information may also include, for example, information regarding the current resources of the UE 101, such as the current charge associated with a battery (if any), the current processing load, and the like. The contextual information module 223 may send the contextual information to the multimodal generation platform 103 with a request for a media segment and/or a media file, or may send the contextual information at the request of the multimodal generation platform 103 or one or more devices or services 109.

The multimodal track module 225 processes the multimodal track received from the multimodal generation platform 103 associated with the media file and/or media segment. In one embodiment, the multimodal track may be a single track that includes multiple modalities. In which case, the multimodal track module 225 extracts each unimodal rule set associated with the user interface elements of a single modality. Where the unimodal rule sets associated with the user interface elements are not integrated between the modalities, the multimodal track module 225 integrates the user interface elements across the modalities based on, for example, common identifiers of the user interface elements, overlapping references of the media segment and/or media file (e.g., frames), etc. In one embodiment, the multimodal track module 225 performs translation of the multimodal track in determining unimodal rules from the multimodal track and adapting these unimodal rules to the formats supported by the unimodal modules 229 resident on the UE 101 and/or associated with the media manager 115 of the UE 101. The multimodal track module 225 also passes synchronization information regarding the user interface elements of the various one or more modalities to the user interface element module 231 so that the user interface element module 231 can present and/or enable the user interface elements synchronized with a particular associated part of the media segment and/or media files. By way of example, the multimodal track module 225 may provide frame and track information to the user interface element module 231 regarding the user interface elements. When presenting and/or enabling the user interface elements, the user interface element module 231 synchronies the frame and track information with the client presenting the media file and/or media segment.

The semantics module 227 processes the semantic track associated with the media segment and/or the media file for processing the semantic elements that describe the media segment and/or segments and/or tracks within the media file. The semantics module 227 may present this information during the presentation of the media segment and/or media file so that the user can understand the information associated with, for example, a particular track associated with the media segment and/or media file.

In addition to the discussion of the features above, the user interface element module 231 can process the one or more scripts that may be associated with the media segment and/or media file and activate the one or more scripts based on the various conditions the scripts are associated with, such as the hot words and/or contextual event handlers. The user interface element module 231 may then execute the one or more functions and/or processes associated with the scripts, such as changing the modalities of the user interface elements based on, for example, changing contextual information of the user and/or the device.

Figure 3:
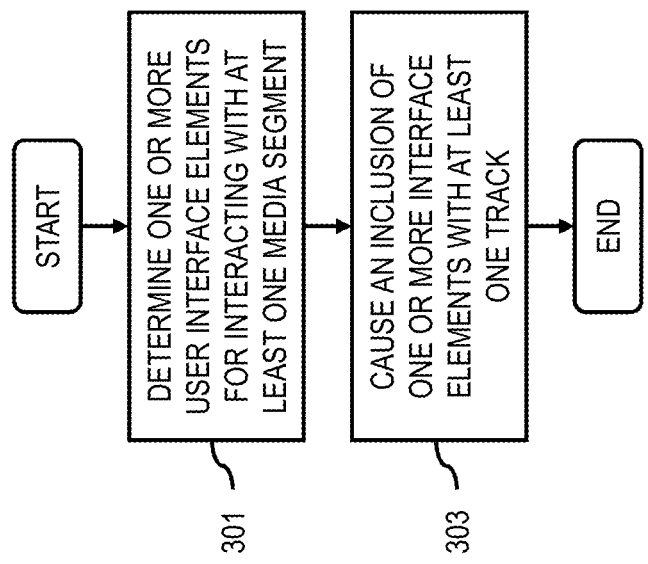
FIG. 3 is a flowchart of a process for associating one or more user interface elements to at least one multimodal track of a media segment, according to one embodiment.
Figure 10:
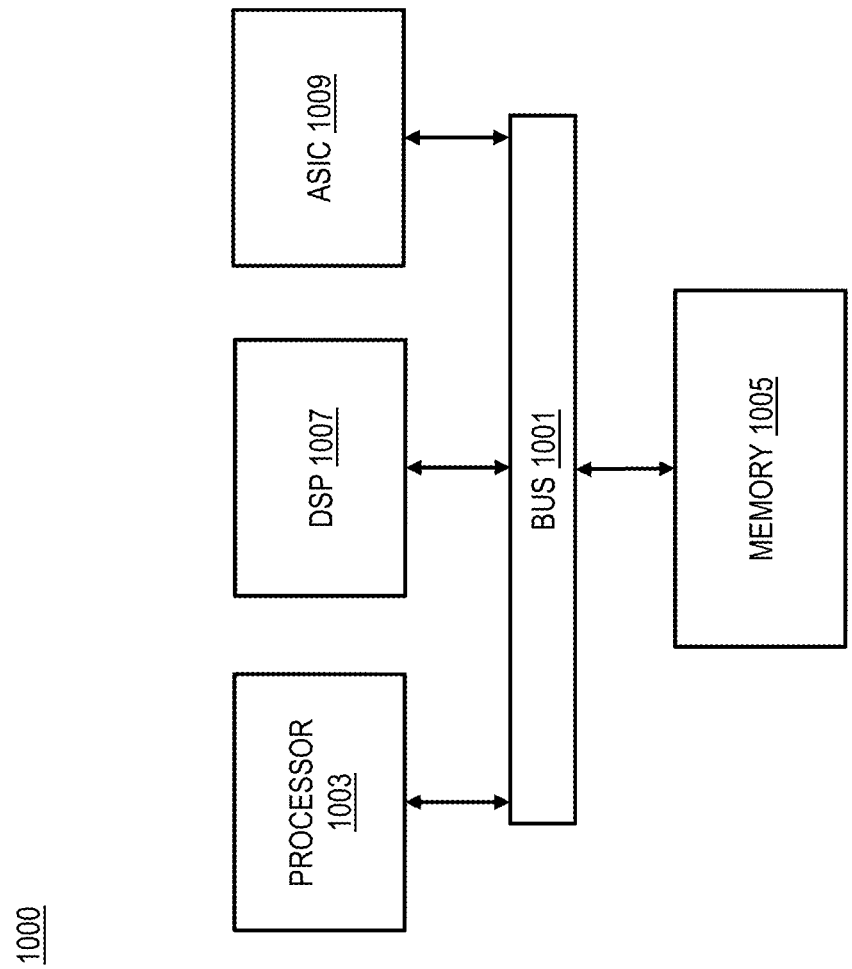
FIG. 10 is a diagram of a chip set that can be used to implement an embodiment of the invention.

FIG. 3 is a flowchart of a process for associating one or more user interface elements to at least one multimodal track of a media segment, according to one embodiment. In one embodiment, the multimodal generation platform 103 performs the process 300 and is implemented in, for instance, a chip set including a processor and a memory as shown in FIG. 10. In step 301, the multimodal generation platform 103 determines one or more user interface elements for interacting with at least one media segment. The user interface elements may be determined based on, for example, another service 109a analyzing the media segment and determining the various tracks, angles, features, and characteristics associated with the media segment. The multimodal generation platform 103 may then determine what user interface elements correspond with the interactions required for presenting the media segment by being able to account for all of the tracks, angles, features, characteristics, etc. associated with the media segment.

By way of example, a media segment may constitute a view that includes multiple scenes of a pink elephant. A user may wish to fast forward to view all of the scenes of pink elephants. The multimodal generation platform 103 thus determines, based on the previously performed processing of determining where the pink elephants are (e.g., based on the video editing service 109a), what user interface elements can be associated with forwarding to the scenes. The determination may extend to various modalities, such as speech, gesture, tactile, etc. Accordingly, the multimodal generation platform 103 may determine user interface elements for advancing to a next scene with a pink elephant based on speech (e.g., speaking "next scene"), a gesture (e.g., wave of a hand), or tactile (e.g., touch a representation of a user interface element presented at a touch screen). The multimodal generation platform 103 determines the user interface elements not only based on what features and/or characteristics are in the media segment that need to be associated with some sort of interactive control, but also based on the device capabilities, user preferences, and/or contextual information associated with the device that will present the media segment and the user that is associated with the device. Where the multimodal generation platform 103 has incomplete information regarding any one of these features, the multimodal generation platform 103 may include various (e.g., all) or default modalities that will allow the device to determine what user interface elements to use upon a presentation of the media segment.

In step 303, the multimodal generation platform 103 causes, at least in part, an inclusion of the one or more user interface elements as at least one track of the at least one media segment. The user interface elements across the various determined modalities are associated with the media segment and synchronized according to the media segment. In one embodiment, the multimodal track may be a single track. However, particularly where the media segment includes more than one track, there may be an individual multimodal track associated with each track contained in the media segment. The multimodal track may then be extracted by the device upon a presentation of the media segment when the at least one track is processed during a presentation of the media segment by the device to cause, at least in part, an enablement of the one or more user interface elements. Accordingly, a user may speak a command (e.g., "next track"), may perform a gesture (e.g., hand wave to the right), and/or perform some tactile input (e.g., touch a screen) to interact with the media segment, which may be enabled based on the inclusion of the multimodal track.

Figure 4:
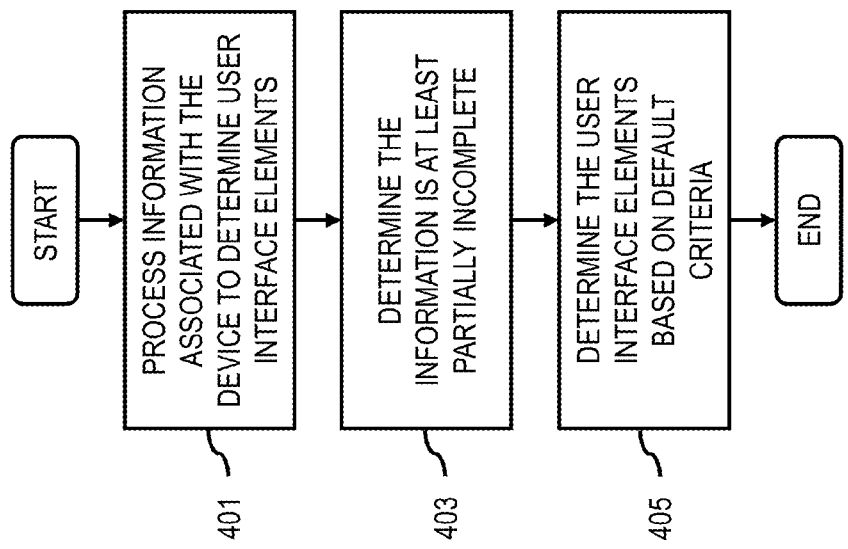
FIG. 4 is a flowchart of a process for processing information associated with a device to determine user interface elements, according to one embodiment.

FIG. 4 is a flowchart of a process for processing information associated with a device to determine user interface elements, according to one embodiment. In one embodiment, the multimodal generation platform 103 performs the process 400 and is implemented in, for instance, a chip set including a processor and a memory as shown in FIG. 10. In step 401, the multimodal generation platform 103 processes and/or facilitates a processing of capability information, preference information, contextual information, or a combination thereof associated with the at least one device to determine the one or more user interface elements. As discussed above, the capability information may be associated with the device and may define, for example, the various modalities of user interface elements the device may be capable of handling. For example, a device may not have speech recognition functionality. In which case, the user interface elements associated with the multimodal track will not be associated with a speech modality. Further, a user associated with a device that does have speech recognition capability may still prefer to not use the speech recognition functionality, as defined by the user preference information. In which case, the user interface elements associated with the multimodal track will not be associated with a speech modality. Even further, a device may have speech recognition functionality. Yet, at the time the request for the media segment is received at the multimodal generation platform 103, the multimodal generation platform 103, based on the contextual information of the device indicating processing resources and/or a battery charge are low, may determine to not include user interface elements associated with a speech modality to conserve processing and/or battery resources. Accordingly, based on the foregoing capability information, preference information, and/or contextual information, the multimodal generation platform 103 can determine the user interface elements of the various modalities to include in the multimodal track to allow for the device and/or user of the device to interact with and control the presentation of the media segment.

In one embodiment, at step 403, the multimodal generation platform 103 may determine that the capability information, the preference information, the contextual information, or a combination thereof is at least partially incomplete. The determination may be made by, for example, not receiving information for one of the three categories, or standard fields within the three categories may not contain information. In which case, at step 405, the multimodal generation platform 103 may determine the one or more user interface elements based, at least in part, on one or more default criteria. The multimodal generation platform 103 may build a default multimodal track that includes one or more default user interface elements for one or more default modalities. What default user interface elements and what default modalities are used may be based on, for example, the features and/or characteristics of the media segment. For example, an audio media segment may have different default user interface elements than a video media segment that may include multiple tracks and multiple angles. In one embodiment, the default user interface elements may all be associated with one modality type, such as associated with a tactile modality. In one embodiment, the multimodal generation platform 103 may build a full multimodal track that includes all user interface elements based on all of the possible modalities. Accordingly, the device, upon processing the multimodal track may determine what user interface elements to use, or the user can select from any type of user interface element according to various types of modalities. However, in one embodiment, the creation of the full multimodal track may not occur based on, for example, limits in the size of the multimodal track or the ability to transfer the track to the device (e.g., limits in the connectivity of the device), which may be determined based on, at least in part, contextual information that is sent to the multimodal generation platform 103 from the device.

Figure 5:
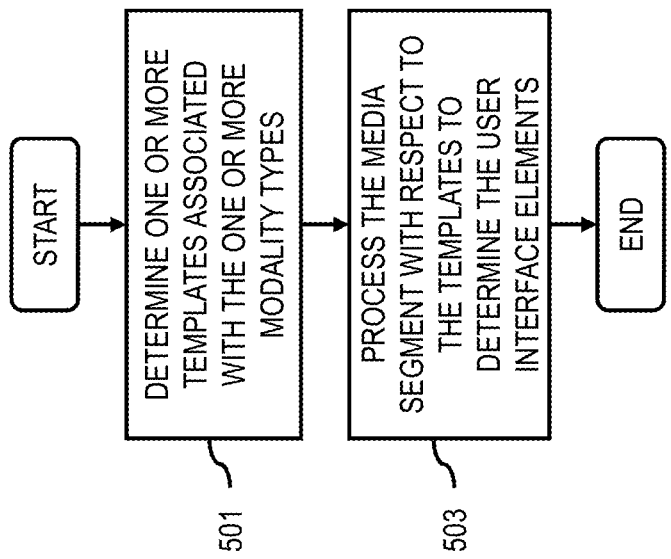
FIG. 5 is a flowchart of a process for processing the at least one media segment with respect to one or more templates to determine user interface elements, according to one embodiment.

FIG. 5 is a flowchart of a process for processing the at least one media segment with respect to one or more templates to determine user interface elements, according to one embodiment. In one embodiment, the multimodal generation platform 103 performs the process 500 and is implemented in, for instance, a chip set including a processor and a memory as shown in FIG. 10. In step 501, the multimodal generation platform 103 determines one or more templates associated with the one or more modality types. The one or more templates associated with the one or more modality types may be determined based on, for example, the modality types the multimodal track will be formatted in according to the device capabilities, the user preferences, and/or the contextual information. Where an audio modality is used, an audio modality template may be determined. Further, the type of media segment may determine what template to use. For example, two templates within the same modality type may be different based on, for example, whether the media segment is audio based, video based with audio, or video based without audio. Further, the determined type of template may be further based on contextual information of the device. For example, for a speech modality, whether the device is associated with some form of high speed network access (e.g., LTE, WiFi, etc.) may determine whether a template is used that contains a large number of audio user interface elements that may be accessed over the network, or a fewer number of audio user interface elements.

In step 503, the multimodal generation platform 103 processes the at least one media segment with respect to the one or more templates to determine the one or more user interface elements, the at least one track, or a combination thereof. Depending on the features and/or characteristics associated with the media segment, such as the tracks, the angles, etc., and based on the user interface elements associated with the determined template, the multimodal generation platform 103 determines the user interface elements across the one or more modalities to include within the multimodal track.

By way of example, where the template is an audio modality template, the multimodal generation platform 103 may determine one or more words, one or more tokens, or a combination thereof with respect to the audio modality template that may be used as user interface elements within the multimodal track. The multimodal generation platform 103 may then process and/or facilitate a processing of a media segment with respect to the one or more words, the one or more tokens, or a combination of the determined audio modality thereof to determine the one or more specific user interface elements associated with the template that are also associated with one or more interactions that are within the media segment. Further, the one or more words, the one or more tokens, or a combination thereof may be based, at least in part, on one or more datasets located at the device, or may be based on one or more datasets located external to the device, such as at one or more services 109 and/one or more content providers 113.

Figure 6:
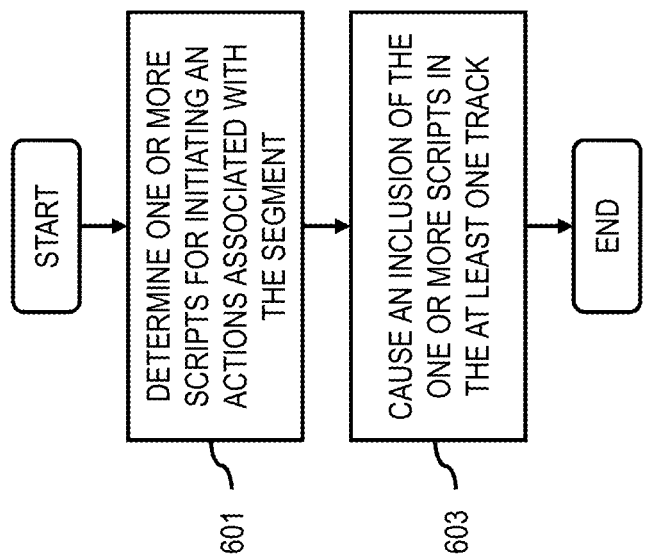
FIG. 6 is a flowchart of a process for including one or more scripts in at least one multimodal track of a media segment, according to one embodiment.

FIG. 6 is a flowchart of a process for including one or more scripts in at least one track of a media segment, according to one embodiment. In one embodiment, the multimodal generation platform 103 performs the process 600 and is implemented in, for instance, a chip set including a processor and a memory as shown in FIG. 10. In step 601, the multimodal generation platform 103 determines one or more scripts for initiating one or more actions associated with the at least one media segment. The one or more scripts may be associated with user comments and/or ratings events, contextual event handlers, and the like. In one embodiment, a media file and/or media segment requested by the UE 101 may require security credentials prior to be presented, or may require security credentials for certain interactions. In which case, the multimodal generation platform 103 may include a script that searches for one or more security credentials prior to presentation of the media segment, such as a software protection dongle. Further, where the device capability information, the user preference information and/or the contextual information received at the multimodal generation platform 103 may have been incomplete, the multimodal generation platform 103 may determine a script to check for the missing information at the device prior to, or upon, presenting the media segment. Such a script can check for modality capabilities and activate/deactivate one or more modalities of user interface elements.

In step 603, the multimodal generation platform 103 causes, at least in part, an inclusion of the one or more scripts in the at least one track, and the one or more scripts are processed during the playback. When the one or more scripts are processed during playback, the scripts perform their one or more intended processes and/or functions, such as determining contextual information and adjusting one or more user interface elements and/or one or more modalities of user interface elements accordingly.

Figure 7:
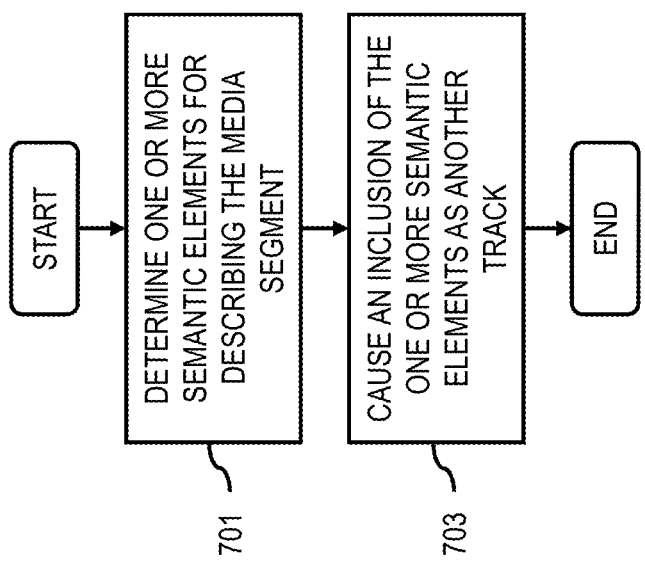
FIG. 7 is a flowchart of a process for associating one or more semantic elements with at least one media track, according to one embodiment.

FIG. 7 is a flowchart of a process for associating one or more semantic elements with at least one media track, according to one embodiment. In one embodiment, the multimodal generation platform 103 performs the process 700 and is implemented in, for instance, a chip set including a processor and a memory as shown in FIG. 10. In step 701, the multimodal generation platform 103 determines one or more semantic elements for describing the at least one media segment. In one embodiment, the media editing services 109a, for example, may process the media segment prior to the multimodal generation platform 103 receiving the media segment to determine the multimodal track. The media editing services 109a may process the media segment to determine, for example, the topics of the segment and direction and/or placement information regarding the segment. The multimodal generation platform 103 may determine the semantic elements that describe the media segment based on the processing of the media editing services 109a. Further, in one embodiment, the multimodal generation platform 103 may include a semantics module 209 that can determine the semantics of the media segment, such as by processing the media segment rather than the media editing services 109a processing the media segment, and determine the semantic elements based on the processing of the multimodal generation platform 103.

In step 703, the multimodal generation platform 103 causes, at least in part, an inclusion of the one or more semantic elements as at least one other track of the at least one media segment. The association of the semantic elements as the at least one other track, such as a semantic track, allows the a user of a device where the multimodal track is not supported to provide the information that is necessary for presenting the media segment and understanding the user interface options available. For example, the semantics track may include information regarding the number of tracks that a media segment includes and/or the number of views such that a user can understand that they are able to change to different tracks and/or different views. Further, the semantic elements associated with the semantic track may be processed during the presentation of the media segment and/or during the enablement of the user interface elements of the multimodal track.

FIGS. 8A and 8B are diagrams of user interfaces utilized in the processes of FIGS. 3-7, according to various embodiments. FIG. 8A illustrates a user interface 801a of a client (e.g., application 111a) associated with a UE 101. The user interface 801a may currently be presenting a representation of a media file and/or a media segment. By way of example, the media segment may be a video. The media file may have been previously processed by the multimodal generation platform 103 so as to include a multimodal track including one or more user interface elements. Indicators 803a may be user interface elements associated with rewinding (e.g., left-pointing double arrows), playing (e.g., right-pointing single arrow) and forwarding (e.g., right-pointing double arrows). The indicators 803a may be associated with a tactile modality where the user touches the indicators 803a to implement the various functionalities. The indicators 803a may be standard to the client. In which case, the multimodal generation platform 103 may have mapped user interface elements associated with a tactile modality to the standard indicators 803a.

The user interface 801a may further include indicator 803b which may be a tactile modality user interface element that allows for switching between tracks and/or segments associated the media file and/or the media segment. Further, the user interface 801a may include a semantics element 803c that indicates the number of tracks and/or views that are associated with the currently presented media segment and/or media file. Thus, by a user touching the indicator 803b associated with the user interface element for switching between tracks and/or angles, the user can switch between the four tracks and/or angles.

In addition, the UE 101 may include a camera 805 and a microphone 807. Based, at least in part, on the inclusion of the camera 805 and the microphone 807, the UE 101 may be compatible with user interface elements of visual and audio modalities. Thus, for example, the functions and/or processes associated with the user interface elements associated with indicators 803a and 803b may be enabled by one or more user interface elements of visual and/or audio modalities, such as speech commands and/or gesture commands. The user interface elements of the tactile, visual and audio modalities may have been associated with the media segment presented at the user interface 801a based on the functions and/or processes of the multimodal generation platform 103 described above.

In one embodiment, FIG. 8B illustrates the same UE 101 of FIG. 8A. However, the context of the UE 101 and/or the user of the UE 101 may have changed such that, for example, it is unsafe for the user to focus on touching the UE 101 to control the presentation of the media segment and/or media file (e.g., the user may be driving a car). One or more scripts associated with the media file and/or segment based on the multimodal generation platform 103 may have detected the change in the context based on one or more changes in the contextual information. The one or more scripts may have activated to change the user interface elements that are active at the user interface 801b of the UE 101 to remove or deactivate any user interface elements of a tactile modality. As seen in FIG. 8B as compared to FIG. 8A, the indicators 803a and 803b have been removed because tactile control over the UE 101 is no longer permitted. Instead, the user of the UE 101 may still interact with the presentation of the media file and/or media segment based on the one or more user interface elements of a visual and/or audio modality (e.g., gestures and/or speech, respectively).

The processes described herein for associating one or more user interface elements to at least one multimodal track of a media segment may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
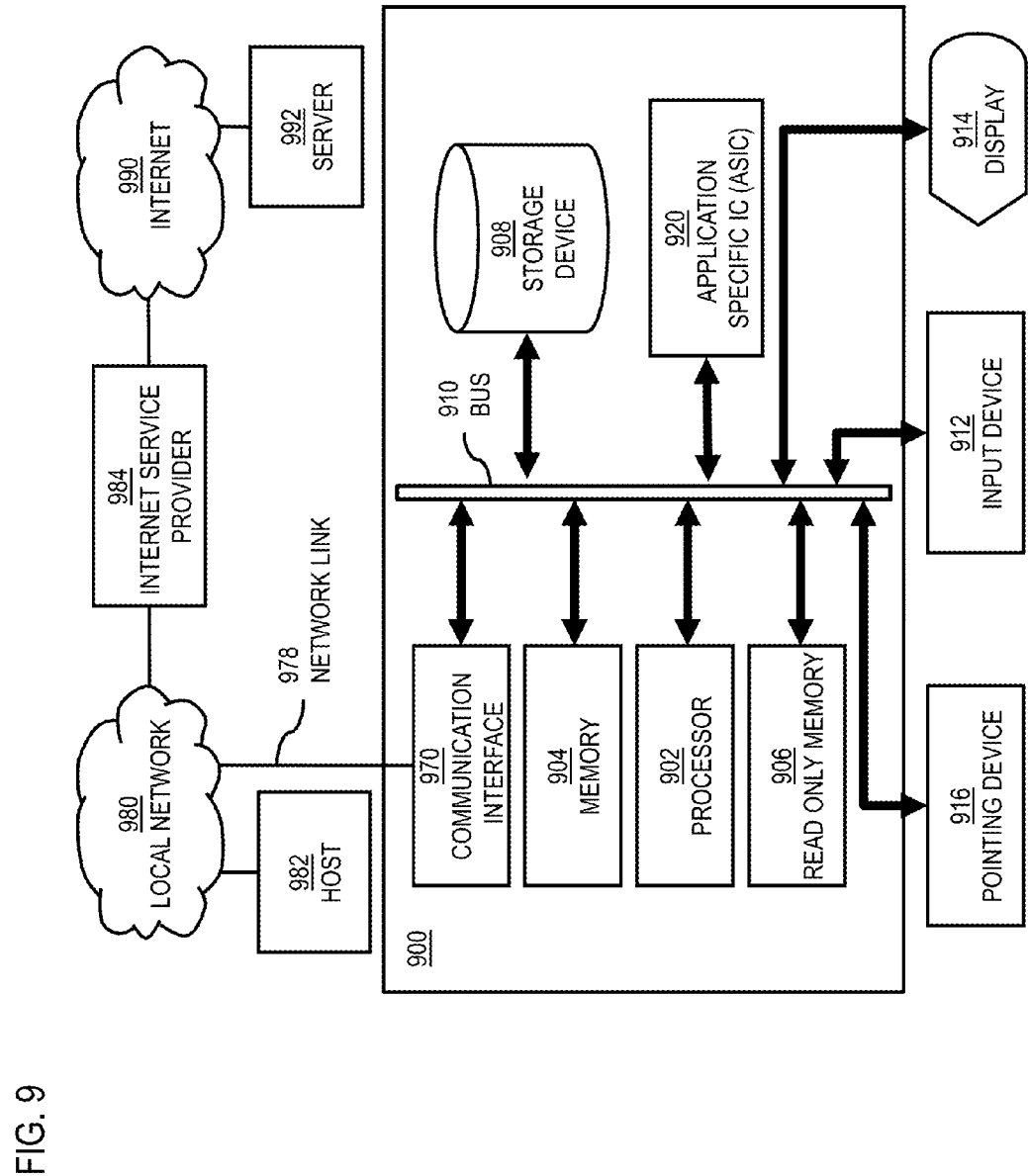
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to associate one or more user interface elements to at least one multimodal track of a media segment as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of associating one or more user interface elements to at least one multimodal track of a media segment.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to associating one or more user interface elements to at least one multimodal track of a media segment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for associating one or more user interface elements to at least one multimodal track of a media segment. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for associating one or more user interface elements to at least one multimodal track of a media segment, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for associating one or more user interface elements to at least one multimodal track of a media segment at the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to associating one or more user interface elements to at least one multimodal track of a media segment as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of associating one or more user interface elements to at least one multimodal track of a media segment.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to associate one or more user interface elements to at least one multimodal track of a media segment. The memory 1005 also stores the data associated with or generated by the execution of the inventive steps.

Figure 11:
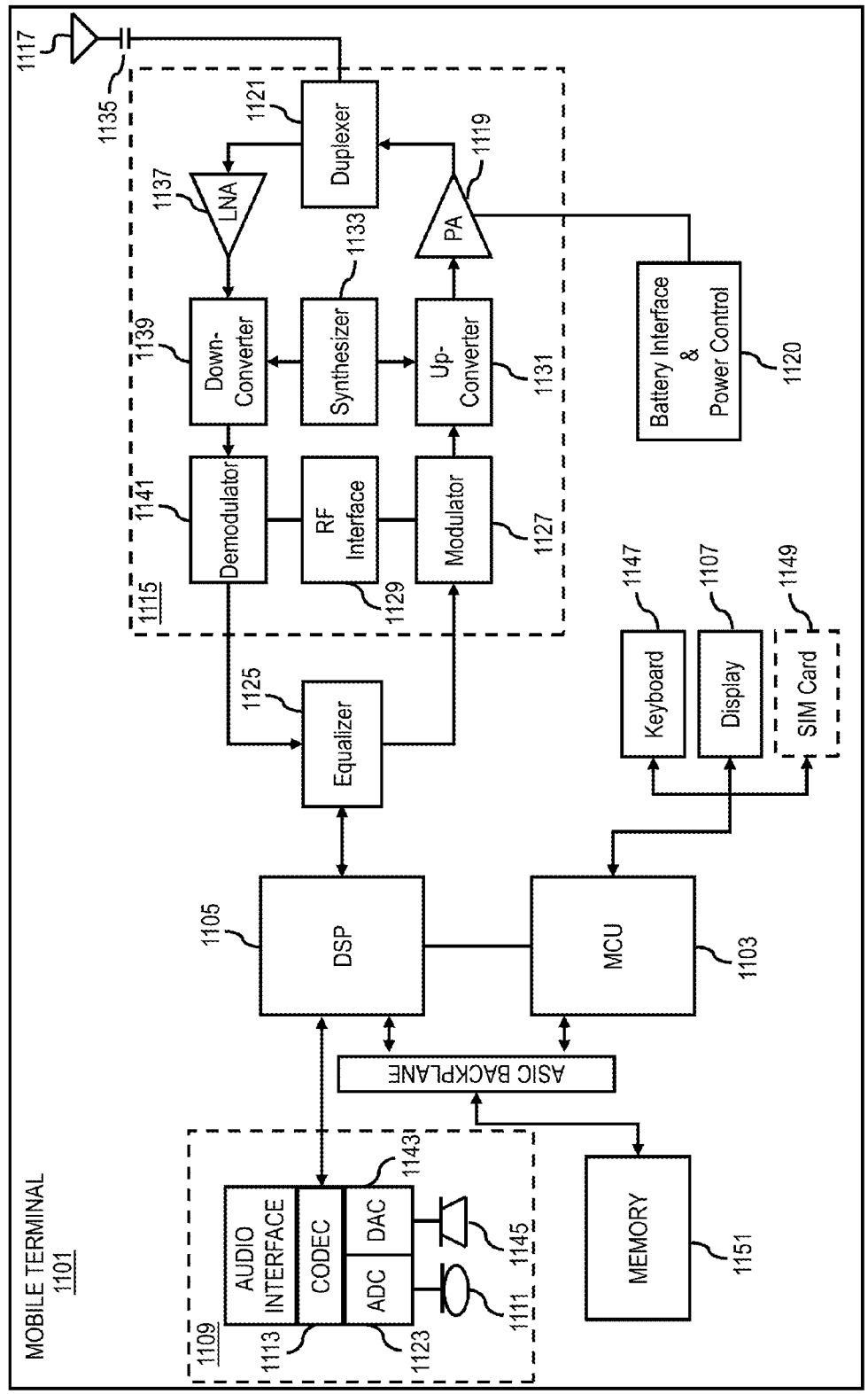
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of associating one or more user interface elements to at least one multimodal track of a media segment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of associating one or more user interface elements to at least one multimodal track of a media segment. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to associate one or more user interface elements to at least one multimodal track of a media segment. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   on a device, presenting a user interface including a user interface element of a first track associated with a first user interface modality type of a media segment;
   including one or more scripts for initiating one or more actions associated with the media segment in at least one track of the media segment;
   determining, with a processor, one or more detected changes in contextual information associated with at least one of the user of the device or the device, wherein the one or more changes are detected during the presentation of the media segment;
   identifying an additional user interface modality type associated with the one or more detected changes in the contextual information;
   identifying a template associated with the additional user interface modality type;
   processing the media segment with respect to the template to modify the user interface element during the presentation based on the template and the identified additional user interface modality type associated with the one or more changes, wherein the user interface modality type comprises at least one of a visual modality, an audio modality, a tactile modality, an olfactory modality or a combination thereof;
   identifying one or more semantic elements based on the user interface modality type, wherein the one or more semantic elements describe characteristics or features of the media segment; and
   including the one or more semantic elements as at least one other track of the media segment.

2. The method of claim 1, further comprising:
   processing any of the capability information, preference information, contextual information, or a combination thereof associated with the one device to identify the user interface modality type.

3. The method of claim 2 further comprising:
   determining that the capability information, preference information, the contextual information, or a combination thereof associated with the device is at least partially incomplete; and
   identifying the user interface modality type associated with the one or more changes based on one or more default criteria.

4. The method of claim 1, further comprising:
   processing the media segment with respect to one or more words, one or more tokens, or a combination thereof in an audio modality template to track one or more topics across tracks.

5. The method of claim 4, wherein the one or more words, the one or more tokens, or a combination thereof are based on one or more datasets located at the device, and the one or more tokens include grammar tokens for speech.

6. The method of claim 1,
   wherein the one or more scripts are processed during the presentation.

7. The method of claim 1, further comprising:
   in response to receiving an indication of a contextual event, cause a cancelling or limiting of the user interface modality type that requires more battery power or is prohibited based on the presence of a software protection dongle attached to the device, or a combination thereof.

8. The method of claim 1, wherein the media segment further represents one of a plurality of views from one single location, the track is processed during the presentation of the media segment by the device to cause an enablement of the one or more user interface elements for switching among views from the one single location, and the views from the one single location include one or more wide-angle views, one or more telephotos, one or more front views, one or more rear views, one or more left views, one or more right views, one or more top views, or a combination thereof.

9. The method of claim 1, wherein the template is associated with the user interface modality.

10. The method of claim 1, wherein the template is a multi-modal template, and the presentation is modified to include at least two modalities.

11. An apparatus comprising:
    at least one processor; and
    at least one memory including computer program code for one or more programs, the at least one memory and the computer program code configured to, with the at least one processor, cause the apparatus to perform at least the following:
    on a device, present a user interface including a user interface element of a first track associated with a first user interface modality type of a media segment;
    include one or more scripts for initiating one or more actions associated with the media segment in at least one track of the media segment;
    determine one or more detected changes in contextual information associated with at least one of a user of the device or the device, wherein the one or more changes are detected during the presentation of the media segment;
    identify an additional user interface modality type associated with the one or more detected changes in the contextual information by executing the one or more scripts;
    identify a template associated with the additional user interface modality type; and
    process the media segment with respect to the template to modify the user interface element during the presentation based on the template and the identified user interface modality type associated with the one or more changes, wherein the user interface modality type comprises at least one of a visual modality, an audio modality, a tactile modality, an olfactory modality or a combination thereof;
    identify one or more semantic elements based on the user interface modality type, wherein the one or more semantic elements describe characteristics or features of the media segment; and
    include the one or more semantic elements as at least one other track of the media segment.

12. The apparatus of claim 11, wherein the at least one memory and the computer program code are further configured to cause the apparatus to:
    process any of the capability information, preference information, contextual information, or a combination thereof associated with the device to identify the user interface modality type.

13. The apparatus of claim 12, wherein the at least one memory and the computer program code are further configured to cause the apparatus to:
    determine that the capability information, preference information, the contextual information, or a combination thereof associated with the device is at least partially incomplete; and
    identify the user interface modality type associated with the one or more changes based on one or more default criteria.

14. The apparatus of claim 11, wherein the at least one memory and the computer program code are further configured to cause the apparatus to:

process the media segment with respect to one or more words, one or more tokens, or a combination thereof in an audio modality template to modify the user interface element.

15. The apparatus of claim 14, wherein the one or more words, the one or more tokens, or a combination thereof are based on one or more datasets located at the device.

16. The apparatus of claim 11, wherein the one or more scripts are processed during the presentation.

* * * * *